May 6, 1958 L. E. SODERQUIST 2,832,991
TIRE REMOVING MECHANISM FOR SHAPING AND CURING PRESSES
Filed Aug. 2, 1955 6 Sheets-Sheet 1

INVENTOR.
LESLIE E. SODERQUIST
BY
ATTORNEYS

May 6, 1958 L. E. SODERQUIST 2,832,991
TIRE REMOVING MECHANISM FOR SHAPING AND CURING PRESSES
Filed Aug. 2, 1955 6 Sheets-Sheet 3

FIG.3

INVENTOR.
LESLIE E. SODERQUIST
BY Ely, Frye & Hamilton
ATTORNEYS

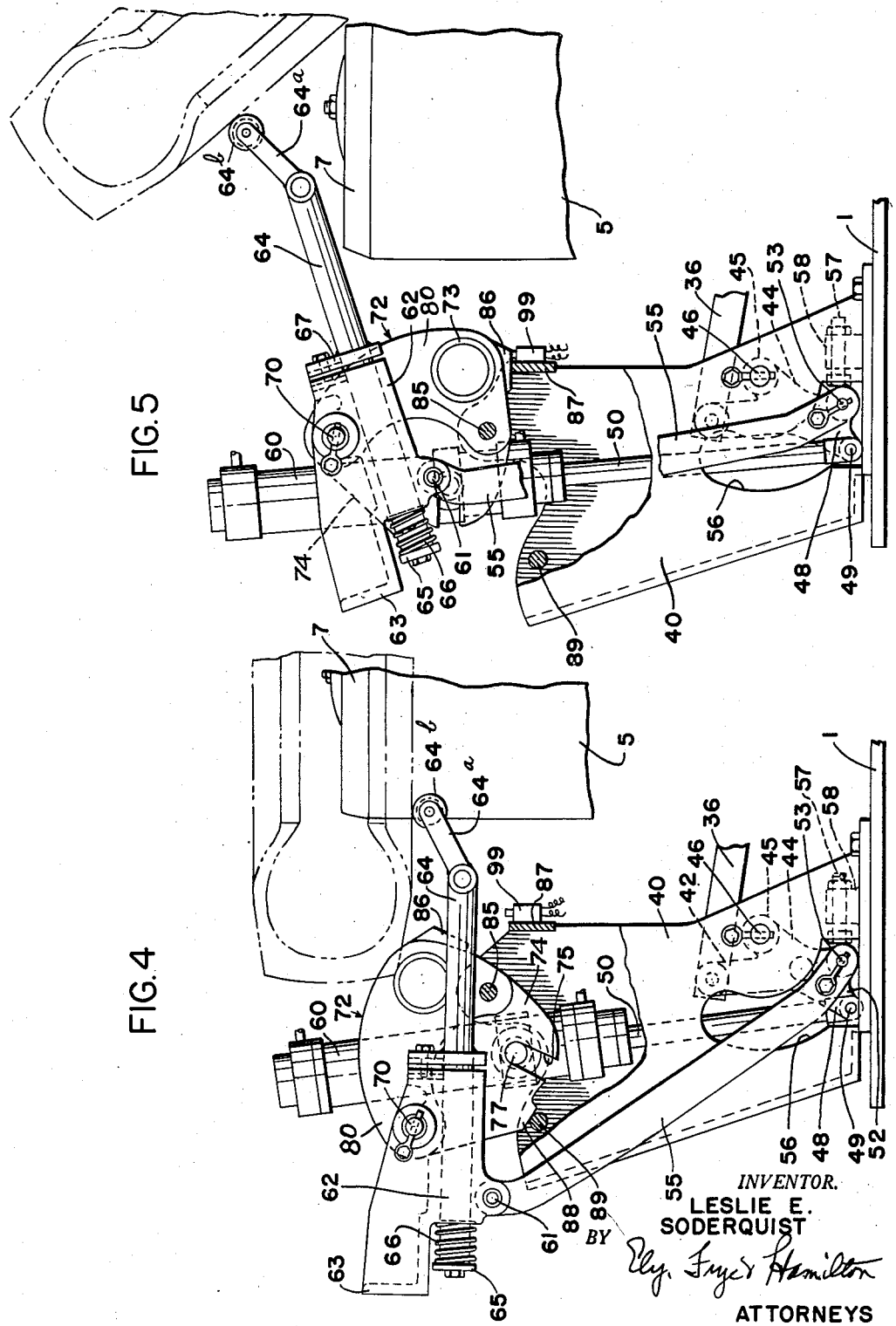

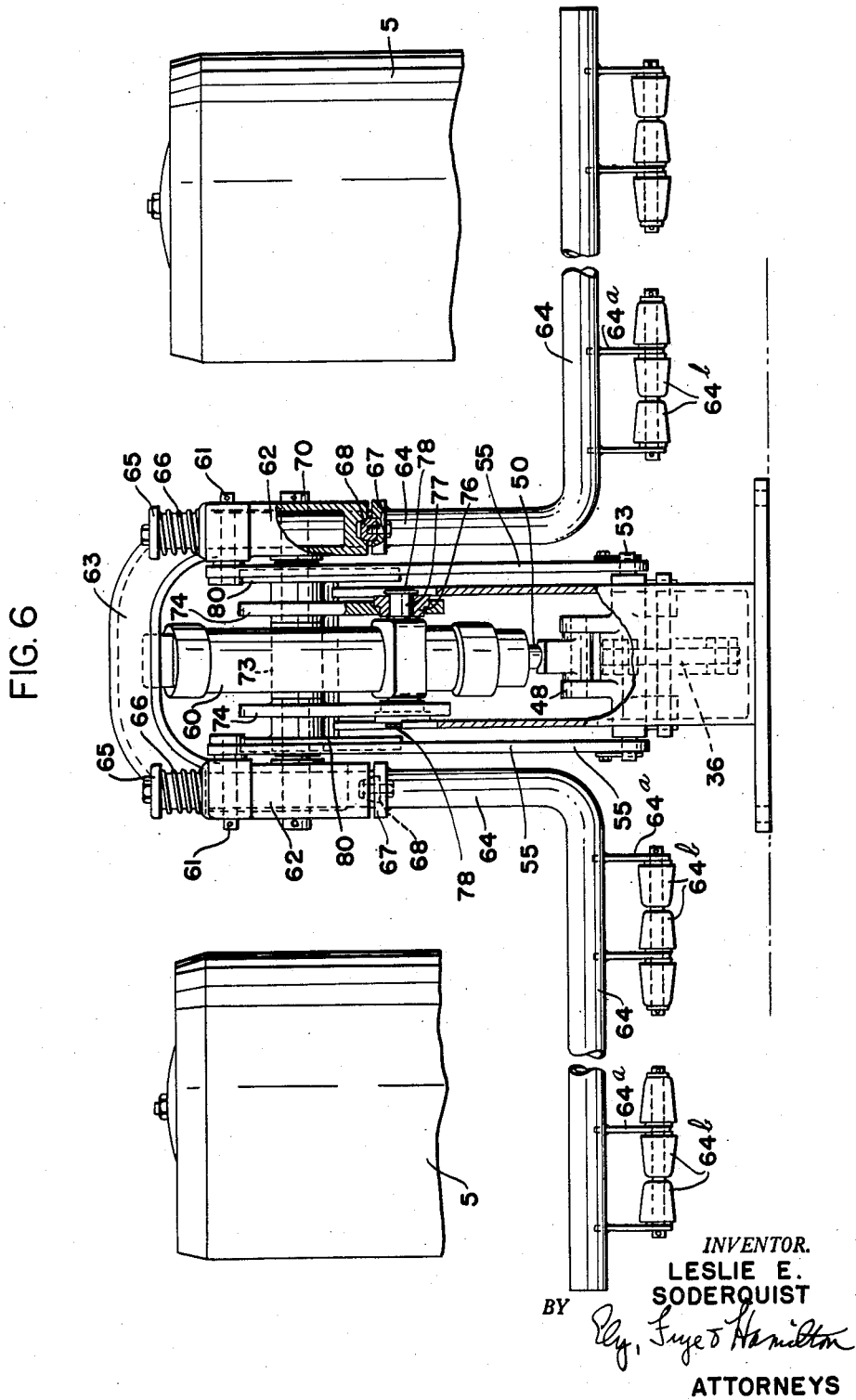

May 6, 1958 L. E. SODERQUIST 2,832,991
TIRE REMOVING MECHANISM FOR SHAPING AND CURING PRESSES
Filed Aug. 2, 1955 6 Sheets-Sheet 6

INVENTOR.
LESLIE E. SODERQUIST
BY
ATTORNEYS

United States Patent Office 2,832,991
Patented May 6, 1958

2,832,991

TIRE REMOVING MECHANISM FOR SHAPING AND CURING PRESSES

Leslie E. Soderquist, Silver Lake, Ohio, assignor to The McNeil Machine & Engineering Company, Akron, Ohio, a corporation of Ohio Application August 2, 1955, Serial No. 525,844

27 Claims. (Cl. 18—2)

The present invention relates to mechanisms for automatically unloading cured tires from presses for shaping and curing tires, and particularly presses of the diaphragm shaping and vulcanizing type such as shown in applicant's prior Patents No. 2,495,664, January 24, 1950, and No. 2,699,572, January 18, 1955.

We have omitted altogether the showing of the top half of the mold of the mechanism for manipulating it as this has nothing to do with the present invention, any type of press operating mechanism being adaptable.

We have also omitted showing the wiring diagram and certain switches by which the movements of the mechanism are automatically controlled, as such details may be designed by any qualified electrical engineer when the sequence of operations is fully understood.

The apparatus for manipulating the diaphragm or other tire forming mechanisms is also omitted, it being sufficient to say, with respect to diaphragm presses, that after the cure is completed the upper half of the mold is raised, leaving the cured tire on the diaphragm in the lower mold section. The diaphragm carrying the cured tire is then raised above the lower mold section, whereupon stripping arms move beneath the tire to a horizontal position and simultaneously the diaphragm is withdrawn from the cured tire. There is then a short pause in the movement of the stripping mechanism to allow the extended diaphragm to be returned to its seat in the lower mold section. This leaves the cured tire at the upper extremity of the diaphragm, resting upon the stripping arms. It has been the practice heretofore for the operator to remove the tire manually from the arms and it is the object of this invention to provide automatic means for removing the tire from the press.

In accordance with the present invention, and referring particularly to diaphragm presses, when the diaphragm returns to its seat in the lower mold section, one of the stripping arms, which will be called the unloading arm, continues its upward movement which is preferably extended over the top of the diaphragm, while the other arm, which will be called the conveying arm, remains in its raised position. This will cause the tire to assume a tilted position and when the angle is sufficient the tire will slide by gravity over the top of the diaphragm and out of the press, where it may fall upon a gravity conveyor which removes it from the press. Either the front or the rear stripping arm may be selected as the arm to be moved to the greater extent, depending upon whether the tire is to be discharged at the front or rear of the press, and while the drawings and description are directed to a rear unloading press, the invention may likewise be applied to a front unloading press by merely reversing the position of the arms.

In the drawings and accompanying description there is shown one embodiment of the invention, it being understood that the showing is of the best known and preferred form of the invention. The device is illustrated as applied to dual diaphragm presses with two mold units but this is not necessary as it may be applied to a single type press. In the drawings, Fig. 1 is a vertical section through a lower mold showing the diaphragm in its extended position and returned to its seat in the lower mold section. In this view, the tire is shown in full lines at the level of the top of the extended diaphragm just before the actual unloading operation is started. The dotted lines show the tire at other points in its travel.

Fig. 2 shows the two stripping arms, the one at the right being that arm which moves to the limited extent while the one at the left is designed to continue its movement to unload the tire after the pause during which the diaphragm is returned to its seat in the lower mold section. In this view the arms are shown in full lines in their lowered or idle position and in dotted lines at the end of their joint movement.

Fig. 3 is a view similar to Fig. 2 but showing both arms raised in full lines and the unloading arm, in dotted lines, in the positions where the tire starts to move out of the press by gravity. On this view the full path of the rollers on the end of the loading arm is traced.

Fig. 4 is a view of the unloading arm at the start of its unloading movement.

Fig. 5 is a view of the unloading arm at the end of its unloading movement.

Fig. 6 is a side view of the unloading arm, the location of the view being indicated by the line 6—6 on Fig. 2.

Fig. 8 is a view showing what is known as the cylinder bell crank.

Figure 1:
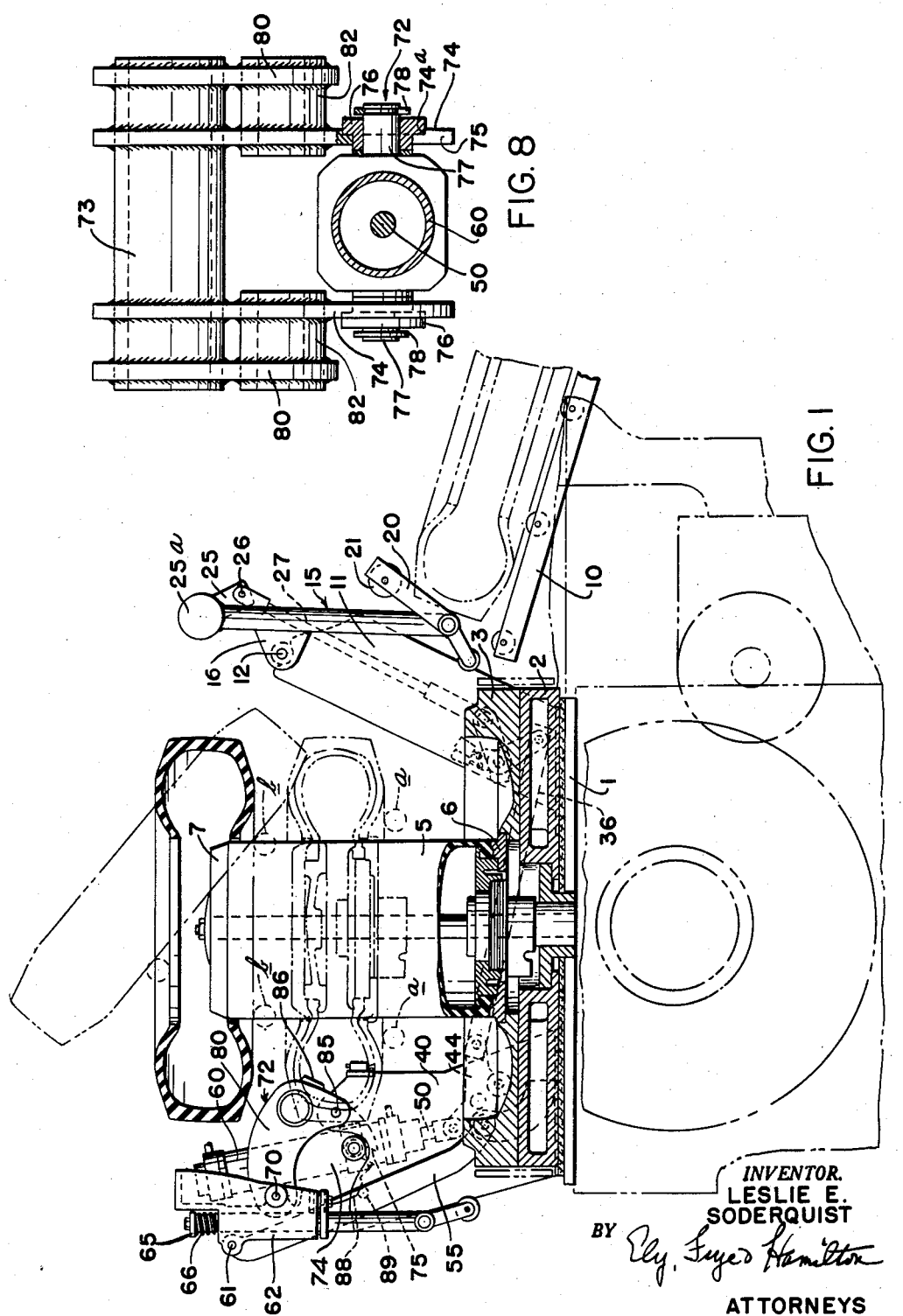

In the drawings, the bed of the press is indicated by the numeral 1, the heated lower platen by the numeral 2, and the lower mold section by the numeral 3. The diaphragm is indicated by the numeral 5, being shown with the lower diaphragm ring 6 seated in the lower mold section. The diaphragm, in full lines, is fully extended after it is stripped from the tire and lowered to its seat in the lower mold section with the ring 7 at fully raised position. The diaphragm is stripped from the tire simultaneously with the movement of the arms from *a* to *b* position, as shown in Fig. 1. While the right or conveying arm remains in the *b* position, the tilting or unloading arm moves to the position shown in Fig. 5, which causes the tire to slide down by gravity until it falls on the conveyor 10. This is a gravity conveyor so that the tire moves out of the machine and, if desired, on a main conveyor (not shown) which may serve a row of presses.

*The conveying arm*

Figure 7:
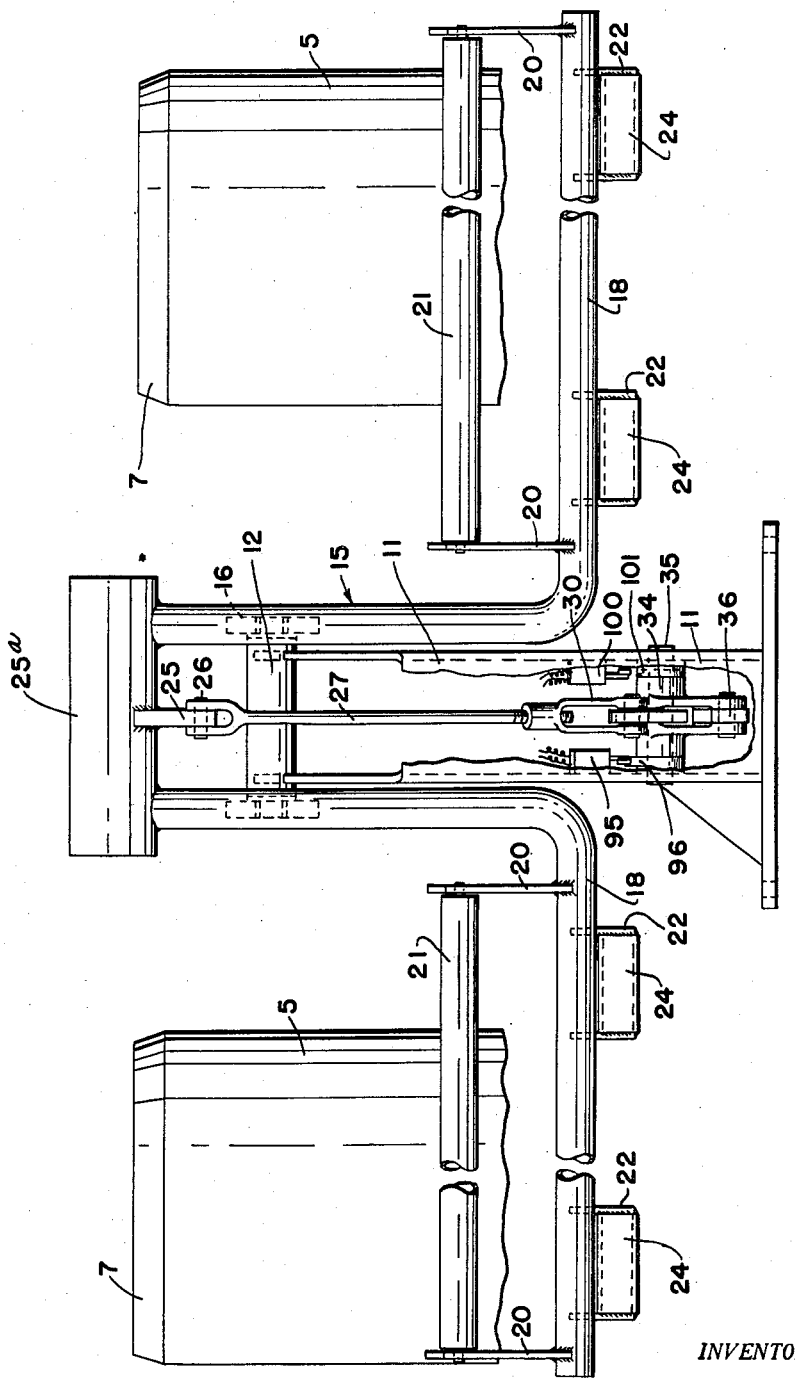
Fig. 7 is a side view of the other or conveyor arm, the location of the view being indicated by the line 7—7 on Fig. 2.

Located on the bed plate 1, at one side of the diaphragm, is a boxlike, upwardly and rearwardly extending stanchion 11, in the upper end of which is a shaft 12 on which the conveying arm, indicated as a whole by the numeral 15, is journaled. Because the press shown herein is a dual press, the arm 15 is formed with a centrally located, U-shaped section, to the arms of which are attached plates 16 which are journaled on bearings on the reduced ends of the shaft 12. At their lower ends the vertical arms 15 are provided with elongated, lateral extensions 18 which extend to the sides of the two diaphragms 5, as shown in Fig. 7. To each extension are attached two parallel, rearwardly extending brackets 20, in the outer end of each of which is supported a freely rotatable tubing 21. Also attached to each extension are a series of outwardly extending brackets 22, in the outer ends of which are located stationary tubes 24. As shown in Fig. 3, when the conveying arm is raised to its upper limit and the unloading arm is likewise raised to its upper limit, the arms form a support for the tire and give it usfficient tilt so that it is propelled by gravity onto the conveyor 10. The fact that the tubes 24 are stationary insures that the tire will be shifted slightly to the left at the end of the upward movement of the arm 15. This insures that the tire does not catch on the ring 7 during the action of the unloading arm.

The arm assembly 15 is raised and lowered through a bracket 25, which is formed as a part of a cross-member 25a, forming the connection between the two members of the U-shaped arm 15. Bracket 25 is pivoted at 26 to the clevis of a link 27, the lower end of which is threaded in a second clevis 30, in which it is held in adjusted position. The lower end of this link is connected to a bell crank lever 34, the hub of which is rotated on shaft 35 at the lower end of the stanchion 11. A center or operating link 36 is connected at one end to the bell crank lever and extends to the other side of the press, where it is connected to and operated by the mechanism which operates the unloading arm during that part of its movement from idle position to the position shown in Fig. 3. The movement of the two stripping arms during the lower 90° or so of their arc of travel is the same.

The unloading arm

Figure 2:
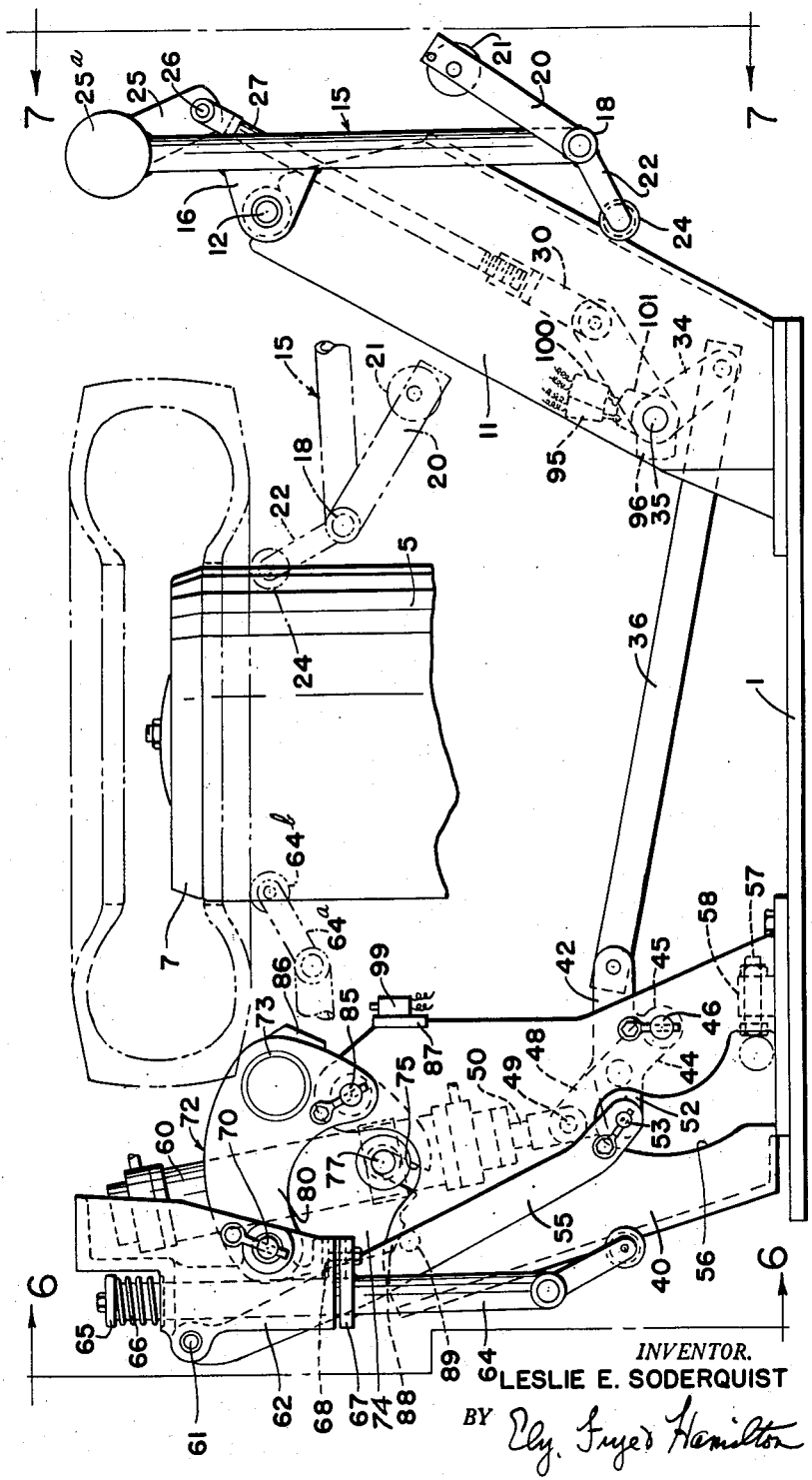

Located on the opposite side of the press from the stanchion 11 is a second stanchion 40, the inner side of which is open to receive the end of the center link 36. This center link is pivoted between two parallel arms 42 of an operating crank lever 44, the outline of which is best shown in Fig. 2. From one side of the lever 44 extend the two parallel trunnions 45 which are journaled on a pin 46 extending across the lower side of the stanchion.

Extending in the opposite direction from the trunnions 45 are two parallel arms 48, across which is the pin 49 to which the lower end of a piston rod 50 is journaled, and extending in the opposite direction from the arms 42 are two parallel arms 52, across which is located a shaft 53. To the ends of the shaft 53 are pivotally connected the lower ends of two parallel operating links for the unloading or tilting arm. These links are given the numeral 55 and, as shown in the several views, lie upon opposite sides of the stanchion, the shaft 53 being extended through slots 56 in the lower side of the stanchion.

To arrest the downward movement of the links 55, in which position the unloading arms are in the horizontal position shown in Figs. 3 and 4, there is provided an adjustable abutment in the path of the shaft 53. This is shown as a headed bolt 57 adjustably held in a lug 58 mounted in the lower portion of the stanchion 40. When the shaft 53 is at the upper end of its movement, the unloading arms are in idle position, as shown in Fig. 2, and when the shaft strikes the abutment 57 the unloading arms have been elevated to the position where they are on the level of the upper end of the arm 15 at the upper end of its movement. This is through the action of the piston rod 50 which is actuated by the double acting cylinder 60 which is held in upright position by means which will be described.

The upper end of each link 55 is pivotally connected at 61 to a bearing sleeve 62. The two sleeves are connected by an offset bridge piece 63 to form a U-shaped central member in which the two unloading arms are mounted. Each unloading arm is given the numeral 64 and is generally L-shaped, being provided along its horizontal portion, at the side of the diaphragm, with brackets 64a in which are mounted rollers 64b.

It is desirable to have the arms 64 mounted so that they can be moved out of the way to allow the lower mold sections to be changed. For this purpose each arm 64 is rotatably mounted in its sleeve 62 and extended above the sleeve, where it is provided with an enlarged head 65. A spring 66 between the head 65 and the sleeve 62 urges the arm upwardly. To each arm 64 below the sleeve 62 is welded a plate 67 which underlies the sleeve and carries a locking key in the form of a wedge-shaped pin 68 which fits in a recess in the underside of the sleeve. This holds the arms in proper position but permits them to be swung out of the way to allow for a mold change.

The sleeves 62 rock about a horizontal shaft 70 which is located in one corner of a lever which may be termed the cylinder bell crank, indicated as a whole by the numeral 72. This bell crank lever consists of an elongated tubular shaft 73, intermediate of which are welded two heart-shaped plates 74 which extend downwardly to either side of the cylinder 60, where they are provided with diagonally located slots 75. Located in the side of each plate 74 at the upper end of the slot 75 is a recess 74a (Fig. 8) in which is held a bearing 76. These bearings are designed to receive trunnions 77 projecting from the sides of the cylinder 60. The parts are held together by snap rings 78.

Also welded to the shaft 73, but close to the ends thereof, are two shorter curved plates 80, the upper edges of which follow the upper edges of the plates 74. At the points 70, where the stripping lever is pivoted to the bell crank assembly, reinforcing sleeves 82 are seated in and welded to the plates 74 and 80.

At the other side of the bell crank lever the plates 74 and 82 are apertured to receive a shaft 85 which is located in the top of the stanchion and about which the bell crank lever is rocked. Movement of the bell crank assembly about the shaft 85 is limited in clockwise direction by lugs 86 on the plates 74 and located so as to strike the top of a cross piece 87 located on the stanchion. Movement in the opposite direction is limited by lugs 88 striking a shaft 89 located in the top of the stanchion.

As shown in Fig. 5, the end of the clockwise rotation of the bell crank lever 72 is reached when the unloading arm is at the top of its stroke, while the end of the anti-clockwise movement is when the bell crank is in idle position with the unloading arm horizontal as shown in Fig. 3.

Operation

Just prior to the full opening of the press, a switch (not shown) is actuated which starts the diaphragm assembly in its movements. When the tire is elevated by the upward movement of the diaphragm, pressure is admitted to the top of the cylinder 60, which projects the piston rod 50 downwardly. This is because there is greater resistance to upward movement of the cylinder at this time. The downward movement of the piston rocks the crank lever 44 which, through the link 55, will raise the left hand stripper arm. Through the center link 36 this movement will also raise the right hand stripper arm. During the upward sweep of the stripper arms, the arms will pass under the tire, as in the a position in Fig. 1. During the continued upward movement the arms will go to the b position and strip the tire off the diaphragm and at the same time the diaphragm is being elongated so that it withdraws from the tire. When the arms reach the horizontal or b position, a limit switch 95 located in the lower part of the stanchion 11 (Fig. 7) is operated by a cam 96 on the hub of the bell crank lever 34. The operation of this switch shuts off the pressure to the cylinder 60 which causes the arms to pause. This pause is sufficient to permit the full stripping of the diaphragm and the return of the diaphragm to its lower position. When the diaphragm reaches its seat in the lower mold, another limit switch located in the path of the diaphragm actuating means (not shown) is actuated, which reopens the pressure line to the cylinder 60.

When the fluid pressure is now admitted to the cylinder 60, and because the abutment 57 prevents any further downward movement of the link 55, the cylinder itself will rise, which, through the trunnions 77, will rock the bell crank assembly 72 in the clockwise direction. The movement carries the unloading arm with it.

By comparing Figs. 3, 4 and 5, it will be seen that the raising of the cylinder shifts the position of the shaft 70, which causes the links 55 to rock about their lower pivots and the arms 64 to rock about the pivots 70. By following the several positions of the end of the arm 64 from horizontal to the extreme raised position, it will be seen that the stripping arms move in a compound arc which moves the outer end of the arm upwardly of the diaphragm and over the top of the diaphragm. The movement lifts that side of the tire well over the top of the diaphragm to the position where it will slide off the arm 64 and over the rollers on the arms 15 to the point where it falls on the off-carrying conveyor. Due to the linkage which controls the movement of the unloading arm, the last phase of its movement will be to the right as shown in Fig. 3, which gives the tire a slight nudge which starts it on its travel. The movement of the unloading arm above horizontal does not transmit any movement to the other stripper arm 15 because the links 55 rotate only about the centers 53, during the period that the bell crank assembly 72 is operating.

At the end of the unloading movement, a third limit switch 99 located on one of the cross pieces 87 is struck by lug 86 on the bell crank 72, which reverses the fluid pressure in the cylinder 60 and causes the tire stripping arms 64 and 15 to return to the lowermost or idle positions. At that point another limit switch 100, located in the stanchion 11, is actuated by a cam 101 on the hub of the bell crank lever 34. This switch is located in the power line to the press closing mechanism and until this switch is closed the press will not close, thus insuring that the arms will be fully lowered and out of the way of the upper mold section when the press closes.

It will be seen that a very effective mechanism has been provided by which the action of the stripping arms which are characteristic of the diaphragm presses of my design is carried forward, making it possible to unload a press automatically at the end of the curing operation.

It will be appreciated that in the broader aspects of the invention the particular mechanism shown and described for raising both arms to the horizontal position, and then continuing the upward movement of one of the arms only, is not essential and may be modified or improved.

What is claimed is:

1. In a press of the type for shaping and curing tires on a diaphragm, two stripping arms on opposite sides of the diaphragm, means for moving both arms to support a tire while the diaphragm is being stripped therefrom and for raising the tire to a point near the top of the diaphragm, and means operative thereafter for raising one of said arms above the top of the diaphragm to tilt the tire to a sufficient extent to cause the tire to slide across the diaphragm and out of the press.

2. In a press for shaping and curing a tire on a tire forming mechanism, a pair of movable arms on opposite sides of the forming mechanism to support and lift the tire along the forming mechanism, and means to move one of said arms above the other to tilt the tire and cause it to slide across the tire forming mechanism and out of the press.

3. In a press for shaping and curing tires on a forming mechanism, a pair of movable arms on opposite sides of the forming mechanism to support and lift a tire along the forming mechanism, means to cause one of said arms to move to a greater extent than the other and over the top of the forming mechanism to tilt the tire sufficiently to cause it to slide across the tire forming mechanism and out of the press.

4. In a press for shaping and curing tires on a diaphragm, a pair of swinging arms on opposite sides of the diaphragm to support and lift a tire along the diaphragm, means to cause said arms to raise simultaneously to a degree sufficient to shift the cured tire to the top of the diaphragm, and means to cause one of said arms to continue its upward movement while the first arm is held at its raised position.

5. In a press for shaping and curing tires on a tire forming mechanism, a pair of swinging arms on opposite sides of the said mechanism, means including a cross link to move said arms in unison from a lowered to a raised horizontal position, and means acting on one of said arms to cause said arm to move upwardly thereafter while the other arm is stationary to a sufficient extent to cause the tire to pass out of the press by gravity.

6. In a press for shaping and curing tires on a diaphragm, a pair of tire supporting and lifting arms on opposite sides of the diaphragm, connectors to move said arms in unison from a lowered to a raised horizontal position, and means acting on one of said arms to cause said arm to move upwardly while the other arm is stationary to a sufficient extent to cause the tire to pass out of the press by gravity.

7. Tire stripping mechanism for diaphragm shaping and curing presses comprising a pair of movable stripping arms, and means acting on both of said arms simultaneously to elevate them to the top of the diaphragm, said means thereafter acting on one arm only to elevate it to a greater extent while the other arm is stationary to cause the tire to pass out of the press by gravity.

8. Tire stripping mechanism for diaphragm shaping and curing presses comprising a pair of movable stripping arms, a pressure cylinder, the piston of which is connected to both of said arms to elevate them simultaneously to a fixed point, and connections between the cylinder and one of said arms whereby further extension of the piston will cause one arm to raise above the other arm to an extent sufficient to cause the tire to be propelled over the diaphragm and out of the press.

9. Tire stripping mechanism for diaphragm shaping and curing presses comprising, a pair of movable stripping arms, operating connections between said arms, and means acting on said connections to raise both arms simultaneously to the level of the top of the diaphragm, said means thereafter acting on one of said arms only to raise said arm to a greater extent to cause the tire to pass out of the press by gravity.

10. Tire stripping mechanism for diaphragm shaping and curing presses comprising, a pair of movable stripping arms, operating connections between said arms, a cylinder and a piston therein, said piston and cylinder being capable of independent movement, means actuated upon movement of the piston to raise both arms simultaneously to a fixed degree, and means actuated upon movement of the cylinder to move one of said arms thereafter while the other arm is stationary.

11. A tire shaping and curing press having a tire shaping diaphragm and a tire stripping device comprising, a support at the side of the press, a lever pivoted on the support, a tire stripping arm pivoted on the lever, means acting first to rock the stripping arm about its pivot to raise the arm to a point near the top of the diaphragm and thereafter to rock the lever about its pivot to cause the stripping arm to be moved above and over the upper end of the diaphragm, and means acting simultaneously with the first movement of the stripping arm to partially strip the other side of the tire from the diaphragm.

12. A tire shaping and curing press having a tire shaping diaphragm, a support at the side of the press, a lever pivoted on the support, a tire stripping arm pivoted on the lever, a cylinder and piston having movement independently of each other, a link connected to the piston and to the tire stripping arm whereby on movement of the piston the tire stripping arm will be raised to approximately the top of the diaphragm, and operative connections between the cylinder and the lever whereby on movement of the cylinder the lever will be rocked about its pivot to carry the tire stripping arm above the top of the diaphragm.

13. A tire shaping and curing press having a tire shaping diaphragm, a support at the side of the press, a lever pivoted on the support, a tire stripping arm pivoted on the lever, a cylinder and piston having movement independently of each other, a link connected to the piston and to the tire stripping arm whereby on movement of the piston the tire stripping arm will be raised to approximately the top of the diaphragm, operative connections between the cylinder and the lever whereby on movement of the cylinder the lever will be rocked about its pivot to carry the tire stripping arm above the top of the diaphragm, a second tire stripping arm on the opposite side of the diaphragm, and connections from the piston to the second tire stripping arm operative to raise the second tire stripping arm.

14. A tire shaping and curing press having a tire shaping diaphragm, a support at the side of the press, a lever pivoted on the support, a tire stripping arm pivoted on the lever, a cylinder and a piston, means acting on the initial extension of the piston in the cylinder to raise the stripping arm about its pivot, and means acting on the further extension of the piston to rock the lever about its pivot to project the stripping arm above the diaphragm.

15. In a mechanism for stripping tires from the diaphragm of a tire shaping and vulcanizing press, a stripping arm at one side of the diaphragm, a pivoted lever, a pivot for the stripping arm on the lever, a link connected to the stripping arm, means to actuate the link to rock the stripping arm about its pivot to a point near the top of the diaphragm, a stop for arresting the movement of the link when said point is reached, and means operative thereafter to rock the lever about its pivot whereby the stripping arm is caused to rock about its pivot to a point above the top of the diaphragm of sufficient elevation to cause the tire to slide out of the press.

16. In a mechanism for stripping tires from the diaphragm of a tire shaping and vulcanizing press, a stripping arm at one side of the diaphragm, a pivoted lever, a pivot for the stripping arm on the lever, a link connected to the stripping arm, means to actuate the link to rock the stripping arm about its pivot to a point near the top of the diaphragm, a stop for arresting the movement of the link when said point is reached, means operative thereafter to rock the lever about its pivot whereby the stripping arm is caused to rock about its pivot to a point above the top of the diaphragm of sufficient elevation to cause the tire to slide out of the press, a second stripping arm at the opposite side of the diaphragm, and connections from the link to said second arm to raise it concurrently with the rocking of the first stripping arm.

17. A mechanism of the type set forth in claim 15 in which the actuation of the link and the rocking of the lever are performed by a single cylinder and piston.

18. A mechanism for stripping cured tires from diaphragm shaping and vulcanizing presses comprising, a pair of arms located on either side of the diaphragm, means for moving both said arms from a lowered position to a position beneath the tire at approximately the top of the diaphragm, means for arresting the movement of said arms in that position, and means operative thereafter for projecting one of said arms above and over the top of the diaphragm to a position where the tire will slide by gravity off both said arms.

19. A mechanism for removing cured tires from a tire shaping and vulcanizing press having a tire shaping means, said mechanism comprising, stripping arms located at opposite sides of the tire shaping means and means for elevating the tire and thereafter moving the arms beneath the tire and raising the arms to unequal extents to elevate one side of the tire above the tire shaping means and to impart a sufficient inclination to the tire to cause it to move by gravity out of the press.

20. A mechanism for removing cured tires from a diaphragm shaping and vulcanizing press comprising, stripping arms located at opposite sides of the diaphragm, means for raising both arms to support the tire while the diaphragm is stripped therefrom, and means for moving one of said arms over the top of the diaphragm so that the tire is tilted to a degree to cause it to slide out of the press by gravity.

21. A mechanism for removing cured tires from a diaphragm shaping and vulcanizing press comprising, stripping arms located at opposite sides of the diaphragm, means for moving one of said arms in a compound curve to raise the side of the tire to the top of the diaphragm and then to project the said arm above and over the top of the diaphragm.

22. A mechanism for removing cured tires from a diaphragm shaping and vulcanizing press comprising, stripping arms located at opposite sides of the diaphragm, means for moving one of said arms in a compound curve to raise the side of the tire to the top of the diaphragm and then to project the said arm above and over the top of the diaphragm, and means for raising the other arm to the top of the diaphragm.

23. In a tire curing press having a stationary lower mold section, tire supporting arms on opposite sides of the mold section and movable below the cured tire after it has been lifted from the mold section, and means operative thereafter to move one of said arms to a greater extent than the other to cause the tire to be tilted to a degree to cause it to slide out of the press by gravity while supported on the arms.

24. In a tire curing press having a stationary lower mold section, tire supporting arms on opposite sides of the mold section and movable below the cured tire after it has been lifted from the mold section, and means operative thereafter to move one of said arms to a greater extent than the other and to cause the arms to approach whereby the tire is tilted to a degree to cause it to slide out of the press by gravity while supported on the arms.

25. Mechanism for removing cured tires from presses comprising two arms movable beneath the cured tire, means for raising one arm above the other to tilt the tire sufficiently to cause it to slide out of the press and for causing the arms to approach while the tire is tilted.

26. In a tire curing press having a lower mold section, tire supporting arms located on opposite sides of the mold section, means to move a cured tire out of the mold section, and means to move the tire supporting arms between the elevated tire and the mold section, then upwardly while the supporting arms are maintained in a horizontal plane and thereafter to position the arms in an inclined plane down which the tire may be discharged from the press.

27. In a tire curing press having a lower mold section and a tire forming mechanism interiorly of the mold section, tire supporting arms located on opposite sides of the mold section, means to move a cured tire out of the mold section, and means to move the tire supporting arms between the elevated tire and the mold section, then upwardly to the top of the forming mechanism while the supporting arms are maintained in a horizontal plane and thereafter to position the arms in an inclined plane down which the tire may move by gravity across the top of the forming mechanism and out of the press.

References Cited in the file of this patent

UNITED STATES PATENTS

| | | |
|---|---|---|
| 1,925,995 | De Mattia | Sept. 5, 1933 |
| 2,278,643 | Braun | Apr. 7, 1942 |
| 2,293,287 | Franz | Aug. 18, 1942 |
| 2,495,664 | Soderquist | Jan. 24, 1950 |